United States Patent
Joos et al.

(10) Patent No.: US 8,093,833 B2
(45) Date of Patent: *Jan. 10, 2012

(54) METHOD FOR CONTROLLING AN ELECTRICAL LIGHT SOURCE BY PULSE WIDTH MODULATION

(75) Inventors: Uli Joos, Nonnenhorn (DE); Christian Voss, Deggenhausertal (DE); Josef Schnell, Wasserburg (DE); Jochen Zwick, Markdorf (DE)

(73) Assignee: Conit Temic Microelectronic GmbH, Nuremberg (DE)

( * ) Notice: Subject to any disclaimer, the term of this patent is extended or adjusted under 35 U.S.C. 154(b) by 772 days.

This patent is subject to a terminal disclaimer.

(21) Appl. No.: 11/661,731

(22) PCT Filed: Jul. 14, 2005

(86) PCT No.: PCT/DE2005/001244
§ 371 (c)(1),
(2), (4) Date: Mar. 1, 2007

(87) PCT Pub. No.: WO2006/024251
PCT Pub. Date: Mar. 9, 2006

(65) Prior Publication Data
US 2007/0262765 A1    Nov. 15, 2007

(30) Foreign Application Priority Data
Sep. 1, 2004   (DE) .......................... 10 2004 042 676

(51) Int. Cl.
*H05B 41/36*   (2006.01)
(52) U.S. Cl. ........................................ 315/307; 315/308
(58) Field of Classification Search ................ 323/299, 323/303; 315/307, 308
See application file for complete search history.

(56) References Cited

U.S. PATENT DOCUMENTS

| | | | |
|---|---|---|---|
| 5,859,506 A * | 1/1999 | Lemke .......................... | 315/308 |
| 6,351,074 B1 * | 2/2002 | Ito et al. ........................ | 315/307 |
| 6,815,898 B2 | 11/2004 | Schenk et al. | |
| 7,288,924 B2 * | 10/2007 | Trandafir et al. ............. | 323/299 |
| 2002/0047642 A1 * | 4/2002 | Miyagawa ..................... | 315/307 |
| 2003/0206163 A1 * | 11/2003 | Kee ................................ | 345/204 |
| 2004/0001076 A1 * | 1/2004 | Leng et al. ..................... | 345/690 |
| 2008/0048587 A1 * | 2/2008 | Joos et al. ...................... | 315/308 |

FOREIGN PATENT DOCUMENTS

| | | |
|---|---|---|
| DE | 197 34 107 | 2/1999 |
| DE | 198 04 539 | 8/1999 |
| DE | 101 15 759 | 3/2002 |
| DE | 101 22 409 | 11/2002 |
| WO | WO03/107723 | 12/2003 |

* cited by examiner

*Primary Examiner* — Adolf Berhane
*Assistant Examiner* — Jue Zhang

(57) ABSTRACT

Disclosed is for controlling a light source by pulse width modulation of a supply voltage. The supply voltage, or a parameter dependent thereon, is measured and the pulse width is controlled as function of the measured value. The supply voltage or parameter is measured at least twice during the pulse and may be cyclically measured. The pulse width of the current or a subsequent pulse is matched to the recorded value of the supply voltage or the parameter. A total value is generated from all of the measured values and compared with a given value and the pulse width of subsequent pulses are matched as function of the difference between the total value and the given value.

5 Claims, 4 Drawing Sheets

METHOD FOR CONTROLLING AN ELECTRICAL LIGHT SOURCE BY PULSE WIDTH MODULATION

BACKGROUND OF THE INVENTION

The invention relates to a method for controlling an electrical light source by pulse width modulation. Exterior lighting in motor vehicles is realized according to prior art by means of filament lamps, discharge lamps or light emitting diodes (LED). With the pulse width modulation via a switching means, which as a rule is a power-MOSFET, a supply voltage is transferred to the light source, whereby the supply voltage or a parameter dependent thereon, such as for example the current or the electrical power, is measured and the pulse width is controlled as a factor thereof.

Contrary to the very slow filament lamps or gas discharge lamps LEDs have a very fast response time, what on the one hand favorably affects the signal effect, for example as a brake light, on the other hand in case of fluctuations of the mains voltage leads correspondingly fast to visible modulations in the luminous intensity. Just for motor vehicle applications the luminous intensity must be adhered to as constantly as possible, however, if due to the low supply voltage and the high load fluctuations in vehicle electrical systems partially not negligible voltage fluctuations appear at the illuminants.

From the citation DE-A1-198 04 539 A1 a circuit for stabilizing the voltage at a lamp is known, in particular for the headlights of a motor vehicle. The essential feature of this invention is that in the electrical circuit of the lamp a supplementary switch is included, which can be controlled by means of a trigger circuit, which switch, if the supply voltage is smaller than the given nominal drop voltage of the lamp, keeps the control of the switch activated such that the lamp is continuously supplied with the "too low" supply voltage, and, if the supply voltage is higher than the nominal drop voltage of the lamp, that the trigger circuit periodically switches the time control switch on and off, with a ratio of duty rating to cycle period, which is equal to the square of the ratio nominal drop voltage to upcoming supply voltage.

From DE-A1-197 34 107 A1 an actually known dimmer for lamps (with mains AC-voltage) is disclosed.

From DE-A1-101 22 409 a circuit for stabilizing the voltage at a lamp, in particular for headlights of a motor vehicle, is known. The essential feature of this invention is that in the electrical circuit of the lamp a supplementary switch is included, which can be controlled by means of a trigger circuit, which, if the supply voltage is smaller than the given nominal drop voltage of the lamp, keeps the control of the switch activated such that the lamp is continuously supplied with the "too low" supply voltage, and, if the supply voltage is higher than the nominal drop voltage of the lamp, that the trigger circuit periodically switches the time control switch on and off, with a ratio of duty rating to cycle period, which is equal to the square of the ratio nominal drop voltage to upcoming supply voltage.

From DE-A1-101 15 759 A1 a switch which can be compared with DE-A1-101 22 409 is disclosed. However, with this invention characteristic values are stored in the control unit via a look-up-table.

From DE-A1-101 05 903 a further device for controlling a lighting equipment of a motor vehicle is disclosed, whereby the control is effected by a pulse width modulation.

It is, therefore, the object of the invention to introduce an appropriate method for controlling illuminants, in particular light diodes. This object is achieved by a method for measuring a supply voltage (U) or a parameter (I,P) dependent thereon; controlling a pulse width is controlled as a function of the measured supply voltage or parameter, wherein the supply voltage (U) or the parameter (I,P) dependent thereon is measured at least twice during the pulse and the pulse width $(T(n),T(n+1))$ of the current or a subsequent pulse is matched subject to recorded values of the supply voltage (U) or the parameter dependent thereon (I,P); and recording the measured values of the supply voltage (U) or the parameter dependent thereon (I,P) during a pulse (n) and a total value (A(n)) being generated from all the measured values for said pulse and compared with a given value (Anom) and the pulse width $(T(n+1))$ of the subsequent pulse is matched as a function of the difference between the given value and the recorded total value (A(n)), a characteristic curve being provided, from which a 100% characteristic value for a pulse with permanently switched on supply voltage (PWM=100%) is created subject to the supply voltage or the parameter dependent thereon, and for each pulse either directly before or on the beginning thereof the current supply voltage or parameter dependent thereon is determined and the corresponding 100% characteristic value is determined from the characteristic curve.

SUMMARY OF THE INVENTION

The invention describes a method, which by an appropriate control with the usual PWM frequencies keeps constant the brightness of the headlights under all electrical system conditions of the vehicle. For this purpose the supply voltage during the pulse is measured at least twice and the pulse width of the current or a subsequent pulse is matched subject to the recorded values. Alternatively to the supply voltage also a parameter dependent thereon, for example the current or the electrical power can be measured as a product of measured current and voltage and can be used for matching to the pulse width.

This can be performed preferably by recording measured values of the supply voltage of the parameter proportional thereto during the pulse and determining a total value from all these measured values of said pulse and comparing with a given value and if the given value has been reached, terminating the pulse.

In particular with a pulse width which cannot be aborted within a pulse scope, it is alternatively also possible to determine at first only a total value from all measured values of a pulse. Thus, the total value corresponds to the surface under the measured or dependent thereon, derived values. Then, the difference between given value and recorded total value is determined and the pulse width of the subsequent pulse is matched as a function of the difference between given value and recorded total value.

Consequently, the difference is compensated in the respective subsequent pulse, or in other words, the current pulse width is determined as a function of the given value and the difference of the previous pulse. Thus, the given value corresponds to a surface, as it would be generated with a constant supply voltage and a given pulse width. Therefore, the difference can be determined by mere subtraction as a corresponding surface difference and can be used as a corrected value in the given value for the following pulse.

If one tries to present a functional dependency of the pulse width on the current supply voltage and of the difference of the average current or of the brightness of previous pulses, this is extremely complex and is possible with adequate accuracy only by a polynomial of at least $5^{th}$ order, what is hardly practicable for an automatic control. A particularly preferred further embodiment of the method is not to directly calculate this complex, but for the light source inherently constant dependency, but to store it in a characteristic curve, which for permanent switching-on, i.e. a duty cycle of 100%, results in the respective total value of 100% characteristic value. Hence, the 100% characteristic value corresponds to the respective surface under a pulse with the width of the pulse scope, i.e. with 100% PWM. However, with it directly the required duty cycle and thus the pulse width can be derived in simple manner from the quotient of the given value corrected by the difference of the previous pulse and the 100% characteristic value. By means of this, the numerical expenditure for such a control is considerably reduced.

The invention will be described in the following on the basis of examples of embodiments taken in conjunction with the Figures.

DETAILED DESCRIPTION OF THE DRAWINGS

Thereby, in a particularly preferred further embodiment a characteristic curve of the brightness as a function of the supply voltage or of the parameter dependent thereon is given for the light source and from the measured supply voltage or the parameter dependent thereon with the characteristic curve an actual brightness value is determined, which is added up via the pulse width and is compared with a brightness given value and the pulse width is controlled as a function thereof. Therefore, at first this aspect shall be further described.

The brightness-characteristic curve of an LED can be taken from the data sheet or can be measured and a function (e.g. as a polynomial of $5^{th}$ order) can be interpolated.

Figure 1:
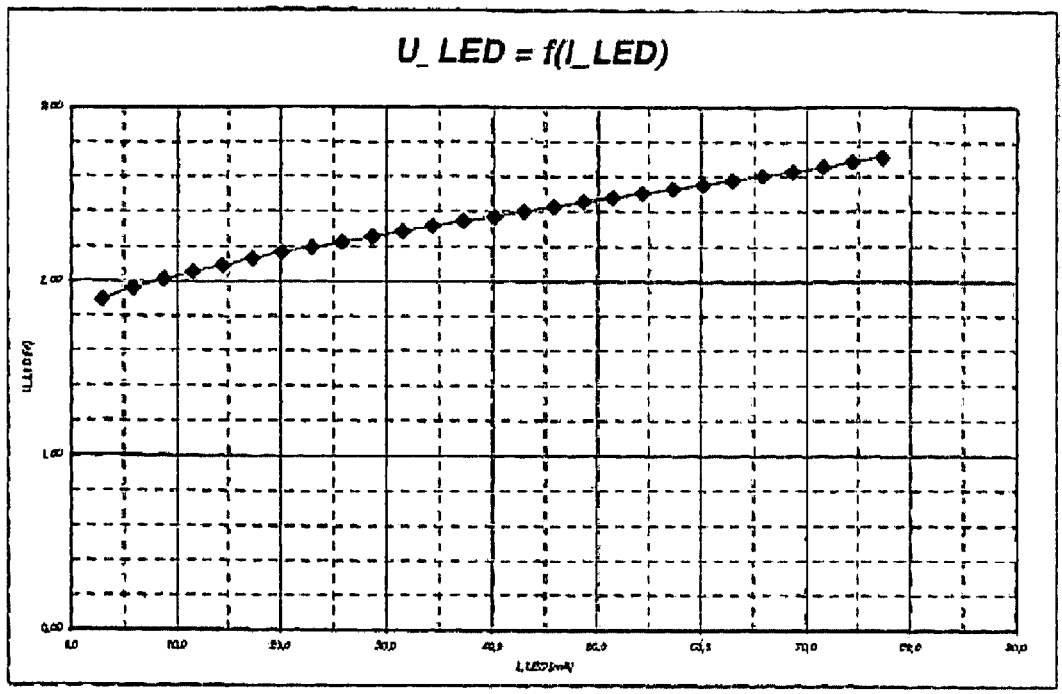
FIG. 1 shows an LED-characteristic curve.

FIG. 1 shows a typical course of an electric LED-characteristic curve and the associated polynomial:

$$U_{LED}(I_{LED}) = a \cdot I_{LED}^5 + b \cdot I_{LED}^4 + c \cdot I_{LED}^3 + d \cdot I_{LED}^2 + e \cdot I_{LED} + f \quad \text{(equ. 1)}$$

with a,b,c,d,e,f=coefficients of the linear polynomial of $5^{th}$ order U_LED=f (I_LED).

Figure 2:
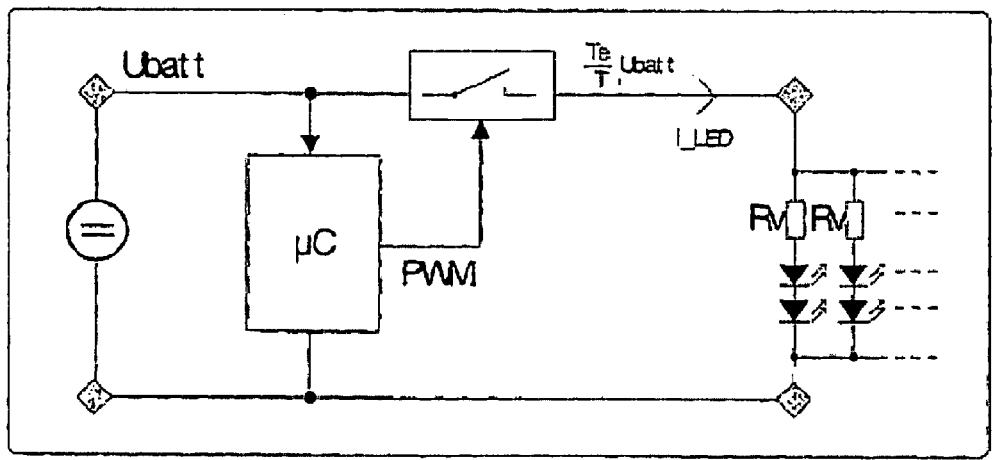
FIG. 2 shows a circuit diagram.

FIG. 2 shows an electrical supplementary circuit diagram of the arrangement. By using this electrical model and the model of LEDs from (equ. 1) all electrical parameters can be calculated iteratively for each operating point:

$$I_{LED}(U_{Batt}) = \frac{U_{Batt} - n \cdot U_{LED}(I_{LED})}{Rv} \cdot m \quad \text{(equ. 2)}$$

with n=number of LEDs connected in series
m=number of parallel LED paths

A high stability of the brightness of the LED can now be achieved, if the characteristic of the brightness is also described mathematically and integrated into the model. For this purpose, the function of the light quantity is required dependent on a control factor.

Figure 3:
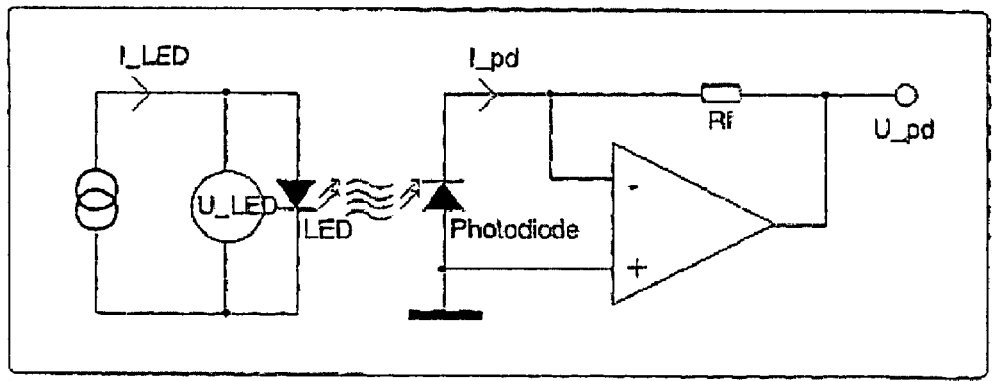
FIG. 3 shows an arrangement for measuring a light quantity.

The light quantity emitted by the LED can be measured e.g. with the arrangement according to FIG. 3:

Here, the current is impressed into the LED and the associated voltage is measured at the LED for each work point. The emitted light of the LED is collected by optical coupling of a photo diode and is converted into a proportional voltage by means of an electrometer amplifier. Hence, the output voltage of the amplifier is proportional to the emitted light quantity of the LED.

Calibration of the emitted light quantity via the current is advantageous in this case, however, is not mandatory, as the work point of the LED can also otherwise be fixed, e.g. via the current average values.

Figure 4:
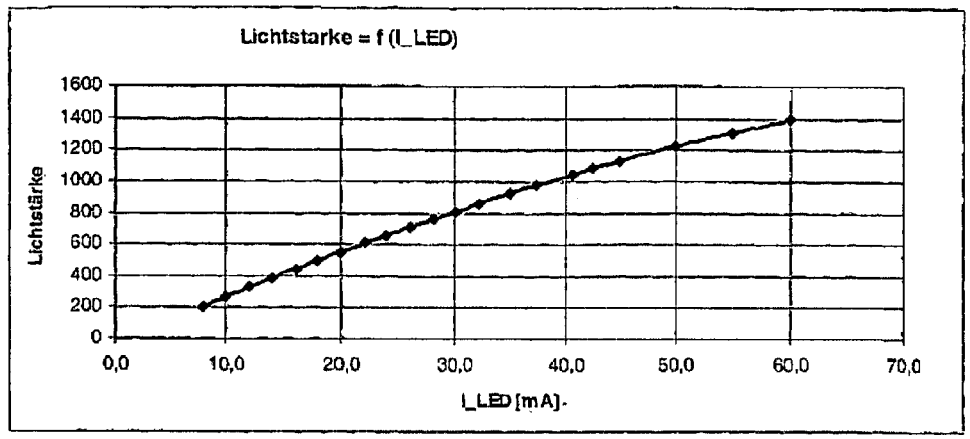
FIG. 4 shows light quantity as a function of current.

FIG. 4 shows a parameter which is proportional to the emitted light quantity as a function of the current in the LED.

The light emitted by the LED can be described by means of polynomial of $n^{th}$ order (e.g. n=2).

$$\phi_{LED}(I_{LED}) = g \cdot I_{LED}(U_{Batt})^2 + h \cdot I_{LED} + i; \quad \text{(equ. 3)}$$

with g,h,i=coefficients of the linear polynomial of $2^{nd}$ order luminous intensity=f (I_LED)

By combining the electrical model (equ.1, equ.2) with the physical model of the LED (equ.3), in turn, the PWM-control characteristic curve of the LED as a function of the supply voltage Ubatt can be determined by iteration.

Figure 5:
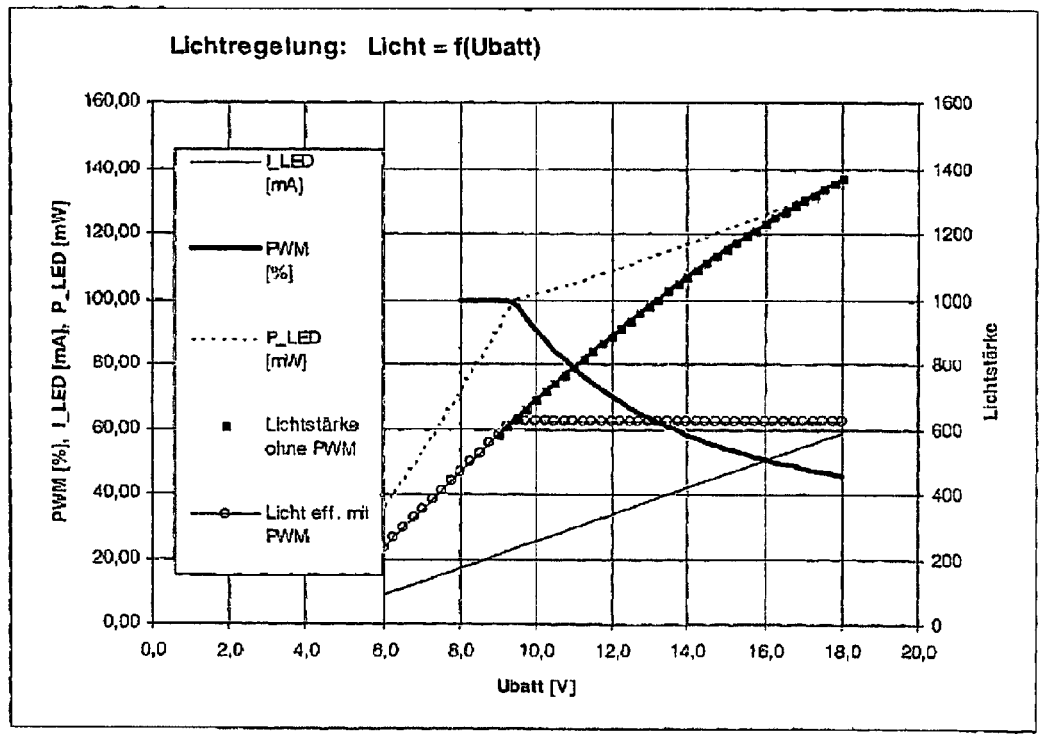
FIG. 5 shows a characteristic curve as an example for two SMD-LEDs connected in series with a multiplier.

FIG. 5 shows this characteristic curve as an example for two SMD-LEDs connected in series with a multiplier of 220 Ohm. In this case, the duty cycle, i.e. the pulse width of the PWM-pulse is controlled in relation to the pulse scope width such that the calculated effective LED light quantity remains constant.

$$PWM(U_{Batt}) = \frac{\phi_{nom}}{\phi_{100\%}} = \frac{\phi_{nom}}{j \cdot Ubatt^2 + k \cdot Ubatt + 1}; \quad \text{(equ. 4a)}$$

with j,k,l=coefficients of the polynomial Light quantity=f (Ubatt)

As the luminous power emitted by the LED with good approximation is proportional to the average value of the current in the LED, the duty cycle can alternatively also be calculated from the average value of the current.

$$PWM(U_{batt}) = \frac{I_{nom}}{I_{100\%}} = \frac{I_{nom}}{k \cdot Ubatt + 1}; \quad \text{(equ. 4b)}$$

with k,l=coefficients of the polynomial I_LED_avg=f (Ubatt)

Figure 6:
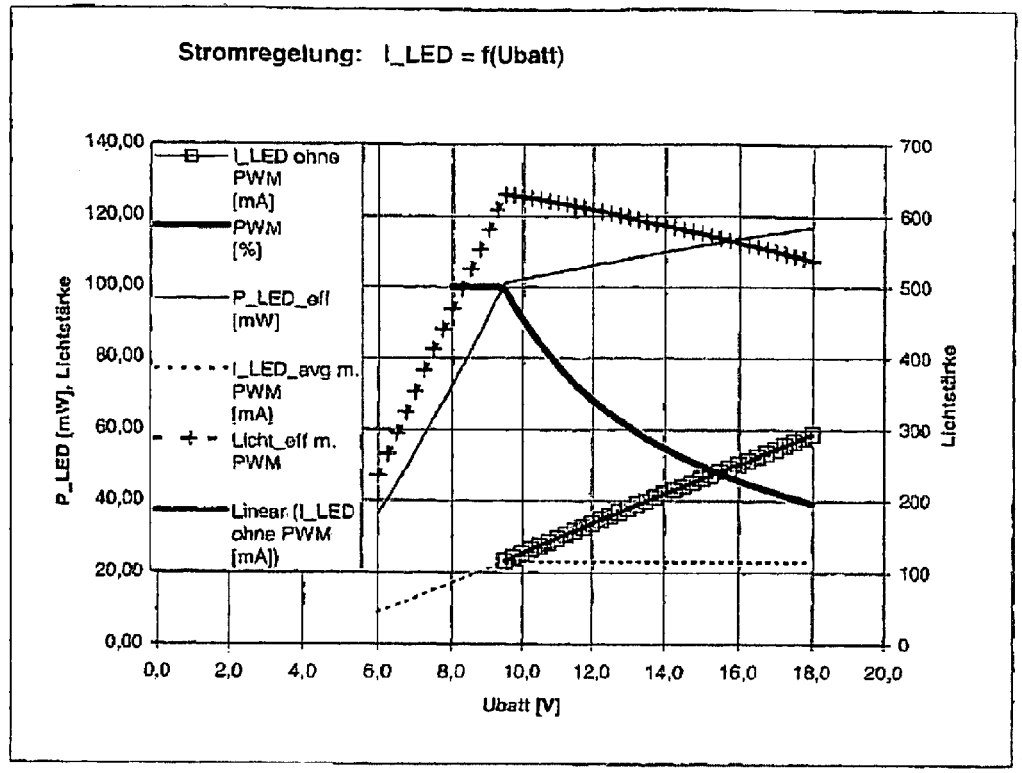
FIG. 6 shows that with the pure current control the light quantity is not 100% constant.

However, FIG. 6 shows also that with the pure current control the light quantity is not 100% constant, i.e. varies along the supply voltage depending on the LED type. A control of the electrical power in the LED matrix would also be possible, but also in this case the light quantity of the LED varies along the supply voltage. By deviating a brightness value while using the characteristic curve and adaptation of the PWM as a function of a corresponding brightness given value this can be compensated with good approximation.

Hence, in addition to the current control the power control or also a brightness control are possible.

For realizing a corresponding PWM-control now preferably the supply voltage Ubatt is sampled by a microprocessor with a multiple of the switching frequency and the power switch is pulse-width modulated controlled accordingly. As particularly in the automobile the vehicle electrical system voltage does not remain constant even short-term, this may result in a visible change in brightness, in particular if the voltage change occurs within the pulse.

This can be corrected preferably, depending on the control characteristics (current-, power- or luminous flux-time-surface, hereinafter simply called pulse surface), by different methods:

1. In each start-up cycle the actual surface is continuously determined by adding up and in the subsequent pulse a corresponding corrected value is taken into account. This method is specially suitable when using pcontrollers with digital timers. Here, the pulse width must be fixed already before beginning the start-up cycle. Furthermore, a low oversampling factor affects only the corrected value to be transmitted to the next pulse, and not on the PWM-resolution.
2. The surface of the current pulse is continuously determined by adding up and the pulse is terminated when reaching the nominal value. This method is particularly suitably in case of very high oversampling rates and thus with a high resolution of the resulting pulse-width modulation.

Example for a method 1:

A pulse surface ($A_{nom}$) is calculated from the given custom-designed brightness and the frequency of the control, which pulse surface ($A_{nom}$) on average is to be achieved per period (T). Further, directly before the beginning of the PWM-cycle the parameter to be controlled, for example the supply voltage, is determined. Then, from the characteristic curve the 100% characteristic value, for example related to the brightness $\phi 100\%$, results.

By using (equ.4) the pulse period $T_n$ is calculated to $$PWM(U_{batt}) = \frac{T_n}{T} = \frac{\phi_{nom}}{\phi_{100\%}};$$ (equ. 5)

or in general:

$$T_n = \frac{A_{nom}}{A_n};$$

During each period n the actual pulse surface ($a_{n\ act}$) is determined by multiple sampling (oversampling) and adding up the surfaces and from this the start-up ratio and thus the pulse surface is determined according to (equ. 4). In this connection it is to be pointed out that either from the recorded measured values while using a characteristic curve the associated surface parameter is determined, i.e. to each supply voltage measured value while taking into account the sampling frequency a brightness contribution or contribution to the average current or the average power is associated and they are added up, or when neglecting the not fully linear dependency simply the measured values, e.g. the voltage sampling values, are directly added up and this sum is then converted into a total value that suits the given value of the physical unit. Whether a brightness value, an average electrical power or the average current is used at the LED as a physical unit is irrelevant for the subsequent derivation of the corrected surface and determination of the width of the subsequent pulse.

The difference ($\Delta A_n$) from actual and nominal value is calculated for the pulse n (with n>1) to each $$\Delta A_n = A_{n\ act} - A_{nom} + \Delta A_{n-1}$$ (equ. 6)

whereas Anom is the basic constant given value, e.g. the desired average brightness, the average current or electrical power and $\Delta A(n-1)$ is the corrected value taken from the previous pulse.

Then, in the subsequent pulse n+1 this difference (equ.6) must be deducted from the nominal value of the current pulse.

The pulse period $T_{n+1}$ for the respectively subsequent pulse thus results in $$T_{n+1} = \frac{A_{nom} - \Delta A_n}{A_{n+1}}.$$ (equ. 7)

Sampling of the control factor Ubatt is advantageously effected with an integer factor of the PWM frequency, the resolution of the sampling exactly determining accuracy of the correction.

Instead of the electrical power as a control factor, naturally also the supply voltage can be used.

Figure 8B:
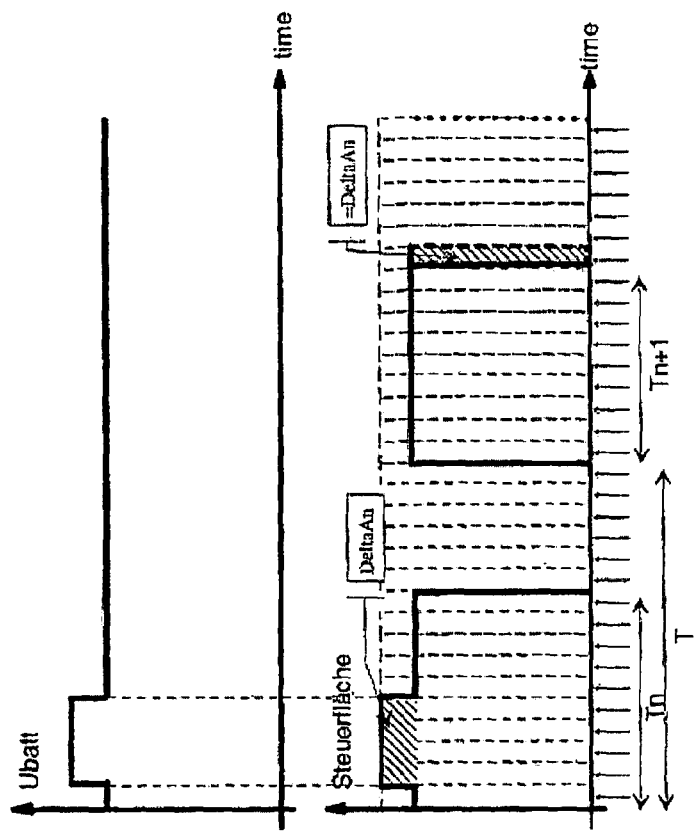
FIGS. 8a and 8b show that fluctuations of the supply voltage within a pulse may be controlled.
Figure 8A:
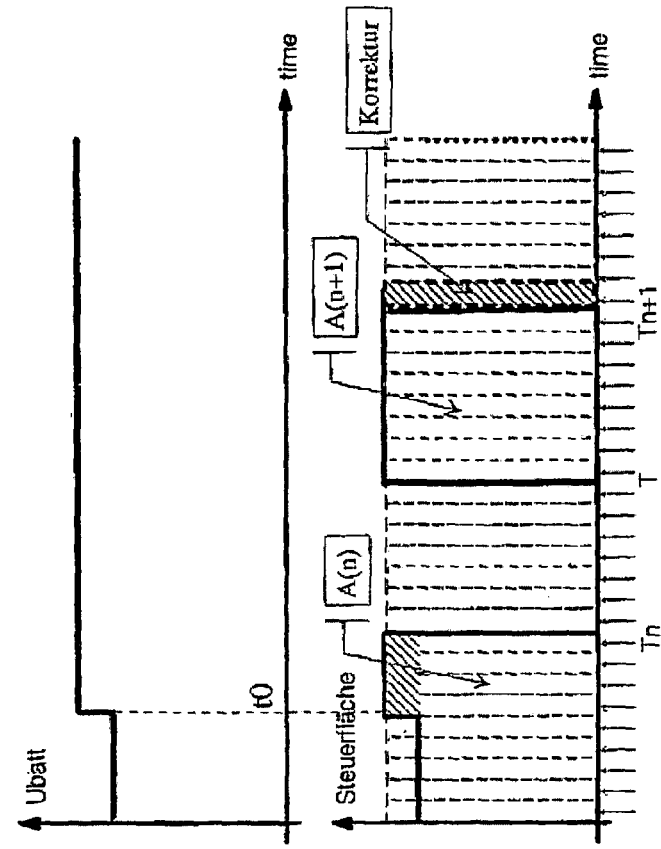

FIGS. 8a and 8b show typical correcting courses for this method. With the beginning of the pulse n respectively starting from the current measured value of the control factor, i.e. in this case the supply voltage, the pulse period T(n) or the duty cycle, respectively, is given.

Subsequently, the control factor in turn is cyclically determined during the pulse period and corresponding brightness values are derived and added with the aid of the characteristic curve. As far as the brightness characteristic curve can be neglected, of course, also the control factor, i.e. the supply voltage itself, the current or the electrical power can be directly added up as a surface. If the supply voltage fluctuates within this pulse n, in this case at the time t0, it comes to a positive difference of the total brightness in this example, which is outlined in hatching in the surface A(n).

If the pulse period in the microcontroller is constant during a pulse there is no direct reaction to this difference. However, this is not so crucial, as in the preferred embodiment this difference is taken into account for the next pulse n+1 and the pulse period T(n+1) is accordingly matched, i.e. is reduced, as it is outlined again by appropriate hatching. The average value of the two surfaces, i.e. (A(n))+A(n+1)/2 again coincides with the given value, as far as the voltage does not again fluctuate. If this amounts again to a difference, counter-control is effected in the respectively subsequent pulse. The particular advantage is that matching of the pulse width is realized by a simple (signed) addition, i.e. a corresponding extension or shortening of the subsequent pulse.

This method is particularly clearly evident in case of a short-term fluctuation of the supply voltage within a pulse, as this is outlined in FIG. 8b. Conventional controls did not at all react to such differences, which are again outlined in hatching. However, in the method presented here, this difference is recorded by the cyclical sampling of the control factor and the subsequent pulse is correspondingly matched in its length, i.e. the surface is smaller by the hatched surface than the surface corresponding to the supply voltage Ubatt at this time, what in turn results in the corresponding pulse width T(n+1).

The advantage of this method is that the frequency of the sampling of the control factor can also be smaller than the increment of the PWM, as far as the fluctuation frequency and the fluctuation strength of the control factor is relatively small and thus the relative fault when determining the difference, i.e. the fault in determining the parameter of the hatched surface can be neglected.

Method 2:

From the given brightness and the frequency of the control a pulse surface ($A_{nom}$) is calculated, which on average is to be achieved per period (T). Furthermore, directly before beginning the PWM cycle the parameter ($A_n$) to be controlled is determined according to (equ.5). During each period n the actual pulse surface ($A_{n\ act}$) is determined by sampling and adding up the surfaces and the pulse is directly terminated when the nominal value has been reached.

By means of these simple correction mechanisms the average brightness of the LES(s) remains constant also with fast changes of the control factor, the short-term deviation from the average value is not perceived by the human eye.

Figure 7:
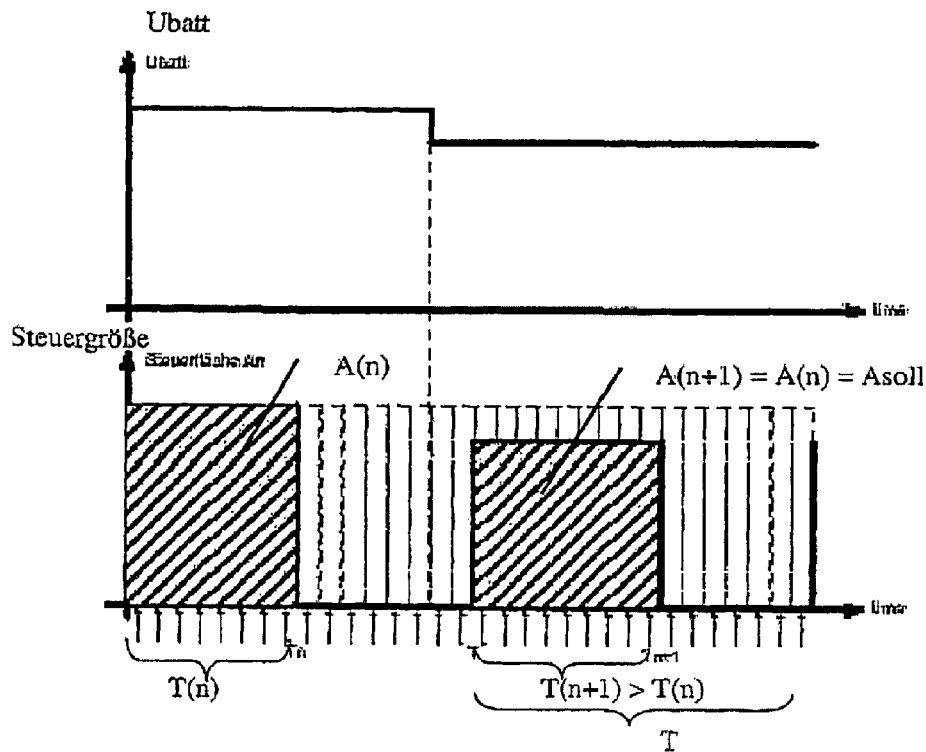
FIG. 7 shows the automatic termination of the pulse as a factor of the added-up surface.

Now, FIG. 7 outlines this method of the automatic termination of the pulse as a factor of the added-up surface. For the two succeeding pulses Pn and P(N+1) as well as the subsequent pulses a constant pulse scope width T is given. With the beginning of each pulse the control factor, here e.g. the pulse voltage Ubatt, is cyclically sampled with a sampling frequency, if applicable, via the brightness characteristic curve a brightness value is associated and these brightness values are added up. This method, in turn, can of course also be applied directly to the supply voltage or a parameter dependent thereon, into which the supply voltage itself is added up.

This is outlined by the hatched surface A(n). If the surface A(n) reaches a given value Anom, at the time T(n) the pulse is terminated and the following pulse (n+1) begins after expiration of the pulse scope width T. As, however, meanwhile the supply voltage has declined, the surface contributions per time of sampling are now smaller. Accordingly, the pulse (n+1) lasts correspondingly longer, until its surface value corresponds again to the given value and the second pulse is terminated. Both surface values A(n) as well as A(n+1) thus correspond with appropriate approximation to the given value Anom. Thus, it is clearly evident that the frequency for sampling the control factor, here the supply voltage, directly determines the possible PWM-resolution.

Fluctuations of the supply voltage within a pulse, as is outlined in FIG. 8, can, of course, also be directly controlled with this method of automatic pulse termination and the pulse width can be matched accordingly.

These methods allow for a control of LED modules via simple multipliers. By the suitable execution of the control method also dynamic fluctuations of the vehicle electrical system voltage can be controlled without noticeable modulations of the luminous intensity.

The invention is based on the fact that the control of the LED module is usually effected already via an output which can be pulse-width modulated. If this PWM-control can be effected such that the brightness of the headlight remains constant with all fluctuations of the vehicle electrical system voltage, the current controller in the headlight (LED module) can be substituted in favor of simple multipliers. The electronics in the headlight can be omitted, so that it can be produced in a substantially more cost-effective manner. A suitable switching frequency for controlling LEDs ideally is in the range of higher than 1 kHz. It must be chosen to be at least such high that all occurring power fluctuations can be controlled by the control, without being perceived by the human eye.

The invention claimed is:

1. A method for controlling an electrical light source by pulse width modulation of a supply voltage, the method comprising:

measuring a supply voltage (U) or a parameter (I,P) dependent thereon;

controlling a pulse width as a function of the measured supply voltage or parameter, wherein the supply voltage (U) or the parameter (I,P) dependent thereon are measured at least twice during a pulse and a pulse width (T(n),T(n+1)) of a current or a subsequent pulse is matched subject to the recorded values of the supply voltage (U) or the parameter dependent thereon (I,P);

recording the measured values of the supply voltage (U) or the parameter (I,P) dependent thereon during the pulse; and comparing a total value (A(n)) generated from all the measured values for said pulse and compared with a given value (Anom), wherein when the given value (Anom) has been reached the pulse is terminated.

2. A method for controlling an electrical light source by pulse width modulation of a supply voltage, the method comprising:

measuring a supply voltage (U) or a parameter (I,P) dependent thereon;

controlling a pulse width is controlled as a function of the measured supply voltage or parameter, wherein the supply voltage (U) or the parameter (I,P) dependent thereon is measured at least twice during the pulse and the pulse width (T(n),T(n+1)) of the current or a subsequent pulse is matched subject to recorded values of the supply voltage (U) or the parameter dependent thereon (I,P); and recording the measured values of the supply voltage (U) or the parameter dependent thereon (I,P) during a pulse (n) and a total value (A(n)) being generated from all the measured values for said pulse and compared with a given value (Anom) and the pulse width (T(n+1)) of the subsequent pulse is matched as a function of the difference between the given value and the recorded total value (A(n)), a characteristic curve being provided, from which a 100% characteristic value for a pulse with permanently switched on supply voltage (PWM=100%) is created subject to the supply voltage or the parameter dependent thereon, and for each pulse either directly before or on the beginning thereof the current supply voltage or parameter dependent thereon is determined and the corresponding 100% characteristic value is determined from the characteristic curve.

3. A method according to claim 2, wherein a corrected given value for the following pulse is determined from the given value (Anom) and the difference for the previous pulse (A(n)−Anom) and the pulse width for the current pulse is determined from the quotient of corrected given value and the 100% characteristic value.

4. A method according to claim 3, wherein for the light source a characteristic curve of the brightness subject to the supply voltage or the parameter dependent thereon is provided, and from the measured supply voltage or the parameter dependent thereon with the characteristic curve an actual brightness value is determined, which is added up via the pulse width and compared to a brightness given value and the pulse width is controlled as a function thereof.

5. A method according to claim 2, wherein at least one light diode (LED) is controlled.

* * * * *